United States Patent [19]

English

[11] Patent Number: 4,676,549

[45] Date of Patent: Jun. 30, 1987

[54] SEAT COVER

[75] Inventor: David R. English, Sumner, Wash.

[73] Assignee: Fashion Magic, Inc., Kent, Wash.

[21] Appl. No.: 845,544

[22] Filed: Mar. 28, 1986

[51] Int. Cl.⁴ .............................................. A47C 31/00
[52] U.S. Cl. ..................... 297/224; 297/229
[58] Field of Search ................. 297/224, 229, 219

[56] References Cited

U.S. PATENT DOCUMENTS

| | | | |
|---|---|---|---|
| 1,820,104 | 8/1931 | Whaley | 297/224 |
| 1,861,455 | 6/1932 | Schwartz | 297/224 X |
| 2,807,314 | 9/1957 | Larkin | 297/229 |
| 2,817,391 | 12/1957 | Zacks | 297/229 |
| 2,904,103 | 9/1959 | Nail | 297/224 |
| 4,232,898 | 11/1980 | Bodrero | 297/224 |
| 4,396,227 | 8/1983 | Neilson | 297/219 |

FOREIGN PATENT DOCUMENTS

| | | | |
|---|---|---|---|
| 2239080 | 2/1975 | France | 297/229 |
| 1153209 | 5/1969 | United Kingdom | 297/229 |

Primary Examiner—Francis K. Zugel
Attorney, Agent, or Firm—Christensen, O'Connor, Johnson & Kindness

[57] ABSTRACT

A cover for use in covering a seat, such as an automobile bucket seat, is provided which includes a non-stretchable portion that covers the forward surfaces of the seat bottom and back, and a stretchable skirt and cap that permits the cover to be adapted to fit a variety of sizes of bucket seats including both those of the high-back and low-back variety. The cover includes the cap, which covers at least a portion of the high-back bucket seat. The cap is stretchable widthwise to accommodate the wider width of a low-back seat and the cap, as it stretches widthwise, simultaneouly decreases in vertical dimension thereby decreasing the overall length of the seat cover so that it more closely fits a low-back bucket seat. In the preferred embodiment, the nonstretchable portion of the seat cover is a sheepskin, while the stretchable portions are made of a wool cloth having a nap similar to the nap of the sheepskin.

8 Claims, 3 Drawing Figures

SEAT COVER

BACKGROUND OF THE INVENTION

This invention relates to seat covers, and more particularly relates to a single size seat cover that is capable of fitting a variety of sizes of seats, even though a substantial portion of the seat cover is made of an inelastic material.

For many years seat covers have been used to cover seats in automobiles, boats and home furnishings. In recent years it has been popular to use sheepskin as a seat cover material, especially in automobiles. The sheepskin provides comfort as well as adding a luxurious feel and look to the otherwise ordinary upholstery of an automobile. Since the seats in different automobiles are of different sizes, fitting a sheepskin seat cover for an automobile seat can be expensive if a custom seat cover is constructed for each seat. Further, if a sheepskin seat cover is designed to fit each different make and model of automobile, retailers would need to carry such a vast stock of seat covers in inventory that it would be impractical. Therefore, there have been attempts in the seat cover industry to provide sheepskin seat covers that will fit a wide variety of sizes of seats.

There are essentially, in the automobile industry, two types of bucket seats, one being referred to as the high-back and the other the low-back. The high-back seat, as the name implies, has a higher or longer back portion than the low-back seat. Also, it is almost universal that the uppermost portion of the back of a high-back seat narrows so that the high-back seat is narrower than the low-back. These two basic seat designs have led the industry in a direction of providing two sizes of sheepskin seat covers to handle most automobile needs. Both a high-back version and a separate low-back version are manufactured and maintained in stock by retailers to accommodate the two types of bucket seats.

Seat covers that fit both high-back and low-back bucket seats, that is, universal fit seat covers, are available, however they are constructed completely out of synthetic materials so that the entire seat cover is stretchable and, in this manner, they are constructed to fit both the high-back and low-back due to the overall stretchability of the fabric. Since sheepskin is a non-stretchable material, it has not previously been thought possible to provide a single size of sheepskin seat cover that would accommodate both the high-back and low-back bucket seats.

It is, therefore, an object of the present invention to provide a sheepskin seat cover that fits both high-back and low-back bucket seats so that only one size seat cover need be kept in stock to meet the public's needs. It should be noted that while the present invention will be described primarily in the environment of automobile bucket seats, it is also possible to use the seat cover made in accordance with the principles of the present invention on other seats as well, for example, seats in boats, private planes, or even home furnishings. Therefore the discussion of the invention with regard to automobile seats is not meant to be limiting, but merely exemplary of one area of use of the seat covers of the present invention.

SUMMARY OF THE INVENTION

In accordance with the above-stated objects, the invention provides a seat cover that accommodates a wide variety of seat sizes. A typical seat includes a bottom portion, which is the portion on which a person sits, and a back portion that extends angularly upwardly from the bottom portion to provide back support for the person sitting on the bottom portion. The cover of the present invention includes a first panel made of an inelastic material. The first panel overlies a first surface of the bottom portion, namely the surface on which the person sits, and also overlies at least a portion of a first surface of the back portion against which the person sitting in the seat leans. A skirt made of a stretchable material is affixed to the first panel and is constructed and arranged to engage and partially surround the bottom portion to hold the first panel to the bottom portion of the seat. The cover also includes a cap made of a stretchable material and affixed to the first panel. The cap is constructed and arranged to envelop an upper end of the back portion and to overlie at least a portion of a second surface of the back portion, which is opposed to the first surface of the back portion. The cap functions to hold the first panel in place on the back portion. The overall length of the seat cover in its relaxed state permits it to fit a high-back seat. The cap is constructed and arranged to stretch widthwise to increase the width of the cap so that it can also accommodate low-back seat widths. The cap is designed so that increasing its width results in simultaneously decreasing the overall length of the cover so that it closely fits the low-back seat.

In a preferred embodiment of the cover of the present invention, the first panel is made of a sheepskin, which is inherently nonstretchable. Preferably the skirt and cap portions are made of a wool material with a nap closely akin to the nap of the sheepskin and joined to the sheepskin in such a manner as to provide an invisible seam to give the impression that the entire cover is sheepskin.

BRIEF DESCRIPTION OF THE DRAWINGS

The structure and function of the present invention will be better understood by those of ordinary skill in the art and others upon reading the ensuing specification, when taken in conjunction with the appended drawings, wherein.

DETAILED DESCRIPTION OF THE PREFERRED EMBODIMENT

As was mentioned earlier, while the cover of the present invention is described herein in the environment of an automobile seat cover, the cover can be used to cover other seats, for example, in boats, planes, or even in home furnishings. Therefore the use of the automobile environment to describe the invention should not be considered as a limitation on the scope of the invention.

Figures 1, 2:
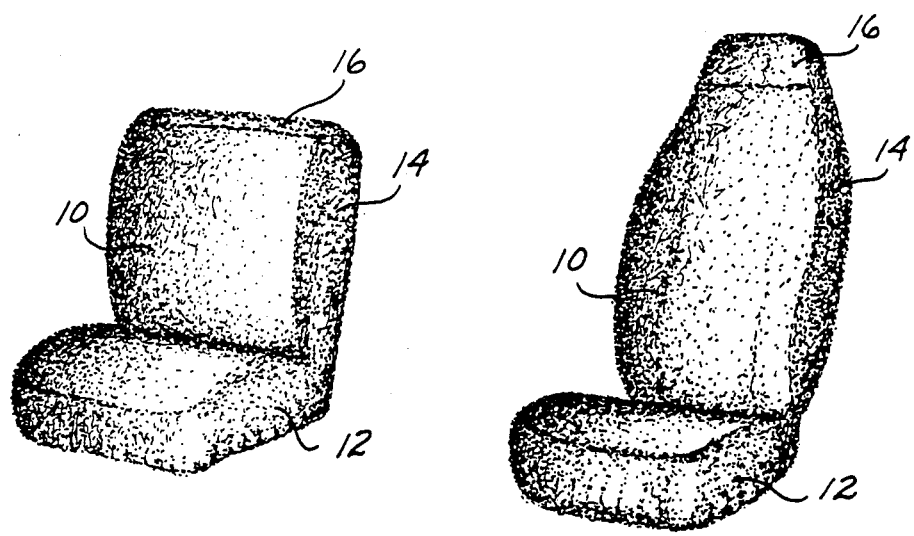
FIG. 1 is an isometric view of a low-back bucket seat having a cover made in accordance with the priciples of the present invention mounted thereon.
FIG. 2 is an isometric view of a high-back bucket seat having the cover of FIG. 1 mounted thereon.
Figure 3:
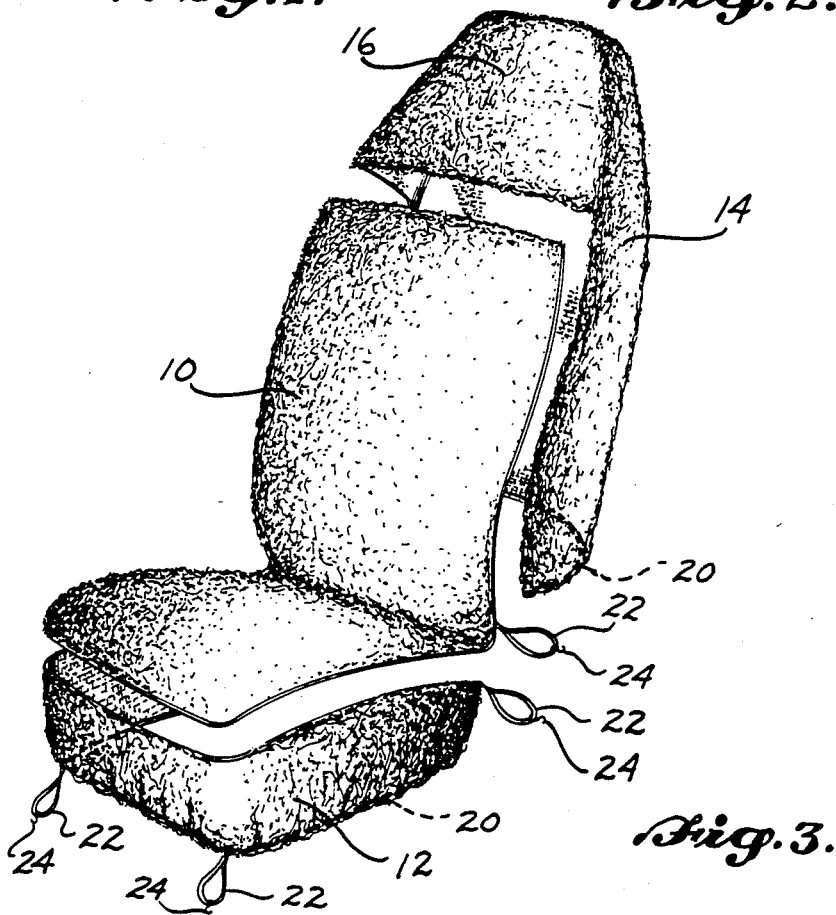
FIG. 3 is an exploded isometric view of a cover made in accordance with the principles of the present invention.

FIGS. 1 and 2 demonstrate, in general, the differences between typical high-back and low-back bucket seats used in automobiles. The high-back bucket seat of FIG. 2 has a back portion which is narrower at the top and taller than the low-back seat shown in FIG. 1. The low-back seat of FIG. 1, on the other hand, is typically wider in its back portion than the high-back seat of FIG. 2. The cover shown on the high-back and low-back seats of FIGS. 1 and 2 is identical and is made in accordance with the principles of the present invention. One embodiment of such a cover is shown in FIG. 3, in an exploded view showing the various sections of the cover for ease of identification. The cover essentially consists of a panel 10 which, in the preferred embodiment, will be a sheepskin. Panel 10 is of a size convenient to cover the upper surface of the bottom portion of the seat and extend upwardly to cover at least a portion of the forward surface of the back of the seat. In a high-back application the panel 10 will not cover the entire forward surface of the back portion of the seat, while in a low-back application the panel typically covers nearly all of the forward surface of the back portion of the seat.

A skirt 12 is attached around the forward three edges of the panel 10 and is made of a stretchable material, such as a wool fabric or synthetic fabric. The skirt 12 serves to surround the bottom portion of the seat to hold the inelastic panel 10 in place on the seat bottom. A cap 14, also made of a stretchable material such as wool, is attached to the portion of the first panel that overlies the forward surface of the back portion of the seat. The cap 14 surrounds the seat back at the uppermost end 16 and has an opening at the bottom so that it can be slipped over the top of the seat back. Once the cap 14 is attached to the panel 10, it forms an envelope which surrounds the seat back. The cap 14 is proportioned so that the uppermost part 16 of the cap 14 provides the additional covering necessary to cover the forward surface of the back portion of the seat where the first panel 10 leaves off. The overall length of the cover from the forward edge of the first panel 10 to the topmost portion 16 of the cap 14 is sized to fit a typical high-back bucket seat. The width of the panel 10 and the cap 14 are also sized to fit the typical high-back bucket seat. An elastic band 18 is sewn in around the bottom edge of the skirt 12 and a similar elastic band 20 is sewn in along the bottommost edge of the cap 14 to draw the opening formed by the lower edge of the skirt and the lower edge of the cap together somewhat to purse the skirt and the cap. When the cover is placed on a seat, the elastic bands 18 and 20 are stretched to widen the respective openings to fit the cover over the seat and the elastic bands 18 and 20 then draw the opening closed partially to better hold the seat cover onto the seat.

It can be seen from FIG. 2 that, when the cover of the present invention is placed on a high-back seat, the cap 14 and skirt 12 essentially remain unstretched except for the pursing effect caused by the elastic bands 18 and 20 described above. However, when the cover is placed on the low-back seat of FIG. 1, it is necessary that the cap 14 stretch widthwise to accommodate the wider back portion of the low-back seat. The stretch muct be accomplished in the cap because the panel 10 is defined to be inelastic and it typically will be sheepskin, which is inherently non-elastic. As the cap 14 is stretched widthwise to accommodate the width of the low-back seat, the height of the cap 14 is simultaneously decreased, thereby decreasing the overall length of the seat cover so that it closely fits the low-back seat without unsightly folds or wrinkles caused by an excess of material. The collapse vertically of the cap 14 as it stretches widthwise also enables the inelastic panel 10 to substantially cover the forward surface of the back portion of the seat.

The cover is provided with elastic strap loops 22 placed on the skirt 12 and at the junction of the cap 14 to the panel 10. Each of the loops 22 has a metal hook 24 attached to it. The loops 22 are stretched under the seat bottom portion and the hooks 24 are engaged with the frame of the seat. In this way the loops 22 and hooks 24 are used to hold the seat cover to the seat so that it is not inadvertently removed by movement of the person sitting on the seat.

The invention therefore provides a single size seat cover that is constructed and arranged to fit a wide variety of seat sizes and, particularly, to fit both the high-back and low-back style of bucket seats in an automobile. As mentioned above, in the preferred embodiment the inelastic panel of the seat will be made of a sheepskin and the cap and skirt portions described above will be made of a wool material which has a nap similar to the nap of the sheepskin so that when the pieces are affixed to one another, the seam between pieces is essentially invisible and the appearance of the cover is of a complete sheepskin cover. While the preferred embodiment includes wool as the cap material and skirt material, it would also be possible to use other synthetics to accomplish a similar result. For example, a synthetic fur material could have a nap similar to the sheepskin nap. It is also possible that the front panel not be sheepskin but simply be a leather or other inelastic material, so long as the cap and skirt portions are made of a stretchable material to accommodate the high-back and low-back seats in the manner described. Further, the placement of the nylon loops for securing the cover to the seat shown in FIG. 3 is exemplary only, and other locations for those loops or other means of tying the seat cover to the seat could be employed. Also, in the illustrated embodiment of the seat cover, the cap portion extends almost completely down the length of the back portion of the seat. While, esthetically, this is pleasing in that it presents an overall covering for the entire seat, the cover will function properly if the cap is extended only partially down the back of the seat. However the upper portion of the cap must completely surround the seat back when used on a high-back seat in order to provide sufficient widthwise stretch, and vertical collapsibility to accommodate the low-back bucket seat with the same cover. Since so many changes can be made to the illustrated embodiment while remaining within the spheres and scope of the present invention, the invention should be defined solely with reference to the claims which follow.

The embodiments of the invention in which a property or privilege is claimed are as follows:

1. A cover for placement over both high-back and low-back bucket-type automobile seats, said seats including a bottom portion on which a person sits and a back portion extending angularly upwardly from said bottom portion to provide back support for a person sitting on said bottom portion, the cover comprising:

a first panel made of an inelastic material, said first panel constructed and arranged to overlie a first surface of said bottom portion of said seat and to overlie at least a portion of a first surface of said back portion of the seat;

a skirt made of a stretchable material affixed to said first panel and constructed and arranged to engage and partially surround said bottom portion to hold said first panel to said bottom portion; and a cap made of stretchable material and affixed to said first panel, said cap constructed and arranged to envelop an upper end of said back portion and to overlie at least a portion of a second surface of said back portion opposite said first surface of said back portion to hold said first panel in place on said back portion, said cap being further constructed and arranged so that an apex of said cap fits over the topmost portion of a high-back bucket seat and is the width of a high-back bucket seat, said cap being stretchable to stretch along its width to increase the width of the cap to the width of a low-back bucket seat while simultaneously decreasing the overall length of said cover to the overall length of the back and bottom portions of a low-back bucket seat.

2. The cover of claim 1 wherein the first panel comprises a sheepskin.

3. The cover of claim 1 wherein the skirt and cap are made of wool cloth.

4. The cover of claim 1, further including elastic straps attached at spaced locations along a free edge of said skirt to tie said skirt to said bottom portion.

5. The cover of claim 1, further including elastic bands sewn into the edges of said skirt and cap said elastic bands being of a length sufficient to purse said skirt and cap.

6. The cover of claim 1 wherein said first panel substantially completely overlies the first surface of said back portion of a low-back bucket seat.

7. The cover of claim 1 wherein said cap substantially completely covers the second surface of said back portion of said seat.

8. The cover of claim 1 wherein said skirt and cap are made of a synthetic material.

* * * * *